United States Patent [19]
Henry

[11] Patent Number: 6,121,814
[45] Date of Patent: Sep. 19, 2000

[54] TRI-STATE BUS CONTROLLER

[75] Inventor: Matthew R. Henry, Fogelsville, Pa.

[73] Assignee: Lucent Technologies, Inc., Murray Hill, N.J.

[21] Appl. No.: 09/169,794

[22] Filed: Oct. 9, 1998

[51] Int. Cl.[7] .................................................. H03K 3/84
[52] U.S. Cl. ........................................... 327/291; 327/293
[58] Field of Search .............................. 327/291, 12, 293, 327/294, 295, 296, 298, 299, 141

[56] References Cited

U.S. PATENT DOCUMENTS

| | | |
|---|---|---|
| 4,347,617 | 8/1982 | Murano et al. ........................ 375/22 |
| 4,348,597 | 9/1982 | Weber ...................................... 307/269 |
| 5,172,397 | 12/1992 | Llewellyn ................................ 375/110 |

*Primary Examiner*—Tuan T. Lam
*Assistant Examiner*—Linh Nguyen

[57] ABSTRACT

A bus master controller comprising a plurality of logic modules, each module coupled to a separate bus driver circuit. The logic module operates using a "break-before-make" protocol derived from a finite state machine, delay element and exclusive-OR gate. The finite state machine generates a predetermined sequence that requires an "assert" signal to always be delayed with respect to a "de-assert" signal, thus eliminating the possibility that more than one set of bus drivers will be coupled to the bus at any one time.

12 Claims, 1 Drawing Sheet

TRI-STATE BUS CONTROLLER

BACKGROUND OF THE INVENTION

1. Technical Field

The present invention relates to a tri-state bus controller for an integrated circuit and, more particularly, to a tri-state controller that eliminates contention between various drivers for the bus and completes driver changeover during a single clock cycle.

2. Description of the Prior Art

A classic challenge in ASIC design is the management of internal bidirectional or multi-party tri-state buses. In particular, a problem arises with changeover of "bus mastership" without contention ("contention" being defined as more than one set of drivers momentarily driving the bus). Bus contention, even for a short duration, can result in excessive power dissipation and, ultimately, reduced product reliability. ASICs are more susceptible to this problem than custom integrated circuits since automatic placement and routing tools do not conventionally consider the issue of balancing delays along multiple paths—such delays being a source of bus mastership contention. To minimize contention, one would need to carefully balance the delay paths to the multiple groups of tri-state drivers that are scattered across the integrated circuit. In instances with a large number of drivers and/or a large integrated circuit die size, this "brute force" technique becomes extremely tedious, expensive and time-consuming. Indeed, this solution becomes even more intractable in arrangements that exhibit asymmetric enable/disable times for tri-state drivers (a common occurrence), or even dissimilar driver types sharing the same bus.

An alternative solution to controlling bus mastership is to change bus masters across two clock cycles. In the first cycle, all of the masters are disconnected from the bus (i.e., each master is "disabled"). In the second clock cycle, a new master (and only one master) assumes control of the bus. The use of two clock cycles thus guarantees that no two masters will be simultaneously enabled, a significant advantage over other prior solutions. However, in high performance systems, it can be a distinct disadvantage to consume two clock cycles to changeover bus mastership.

An exemplary "single clock" prior art solution includes a gating control arrangement associated with each "bus enable" signal, the arrangement requiring that all other "bus enables" be de-asserted before a new "bus enable" can be asserted. It has been found, however, that the gating arrangement is prone to glitching behavior related to recognizing "de-assertion" and, like the "brute force" technique, requires some attention during placement and routing. Further, the gating control arrangement scales poorly as the number of bus masters grows, since each driver circuit must be fully interconnected to every other driver circuit on the bus.

Thus, a need remains in the art for a tri-state bus controller that consumes only a single clock cycle, yet eliminates the bus contention problem prevalent in conventional circuit design.

SUMMARY OF THE INVENTION

The present invention relates to a tri-state bus controller for an integrated circuit and, more particularly, to a tri-state controller that eliminates contention between various drivers for the bus and completes driver changeover during a single clock cycle.

In accordance with the present invention, each bus master is configured to include a "break-before-make" logic module, where the module includes a 2-bit gray-coded finite state machine, delay element and exclusive-OR gate that work together to change bus masters in a single clock cycle. The delay element ensures that the current "enable" signal is de-asserted before any other "enable" signal is accepted. Therefore, in a circuit including N bus masters, a plurality of N logic modules would be required, each associated with a separate bus master. A 1-of-N decoder is coupled to the plurality of N logic modules and is used to provide the desired "enabled" signal to the logic modules. That is, the decoder supplies a single "assert enable" signal and a plurality of N-1 "de-assert enable" signals.

In particular, each logic module includes one signal path for "de-assert enable" and one signal path for "assert enable", where the delay element is disposed along the "assert enable" signal path. Therefore, the "break-before-make" protocol is guaranteed and only one bus master will ever be "enabled". The length of the implemented delay needs to be less than one clock cycle, but should be sufficiently long to compensate for various propagation delays across the integrated circuit.

In a preferred embodiment, the finite state machine comprises a pair of flip-flops and an associated pair of multiplexers, with a "reset" signal also applied as an input to each flip-flop to safeguard the logic module from improper operation during start-up or power interruptions. A flip-flop/multiplexer combination is associated with each signal path (i.e., "assert enable" and "de-assert enable"). The output from the delay element (disposed along the "assert enable" path) and the output from the "de-assert enable" path's flip-flop are provided as inputs to the exclusive-OR gate, the output from the gate being the "output enable" signal for that bus master.

Various other arrangements and embodiments of the present invention will become apparent during the course of the following discussion and by reference to the related drawings.

BRIEF DESCRIPTION OF THE DRAWINGS

Referring now to the drawings.

DETAILED DESCRIPTION

Figure 1:
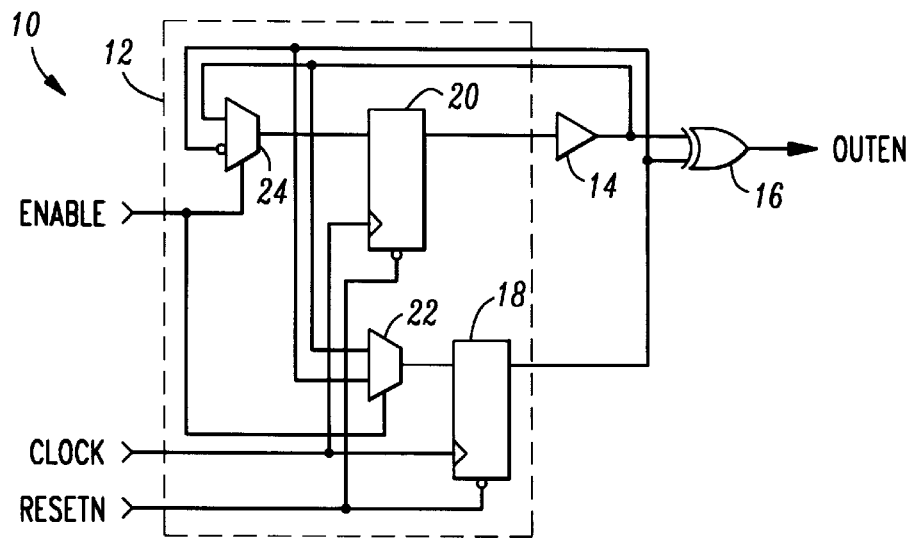
FIG. 1 is a diagram of an exemplary "break-before-make" tri-state bus controller logic module formed in accordance with the present invention.
Figure 2:
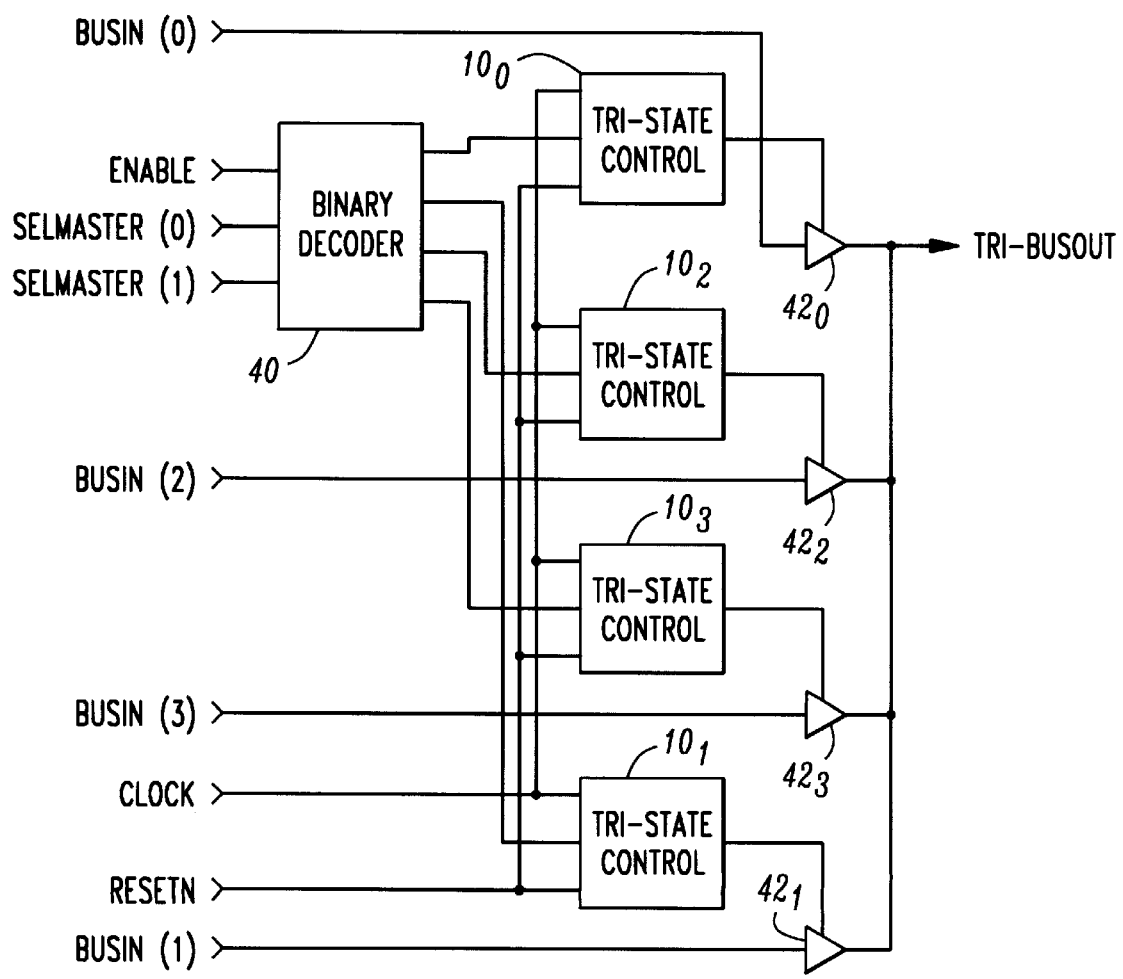
FIG. 2 illustrates an exemplary arrangement using a set of four logic modules of the present invention for controlling bus driver selection between inputs $BusIn_0$–$BusIn_3$.

An exemplary "break-before-make" logic module 10 of the present invention is illustrated in FIG. 1. As described above, module 10 is coupled between a specific bus master and the bus signal line. A plurality of such modules, operating together as described below in association with FIG. 2, provide the "assert enable" to the desired set of drivers for operating the bus, while providing the "de-assert enable" signal to all remaining drivers. Referring to FIG. 1, module 10 includes a finite state machine 12, delay element 14 and exclusive-OR gate (XOR gate) 16 interconnected as shown. A set of three separate inputs are used to control the operation of logic module 10, an "enable" signal, the integrated circuit "clock" signal, and a "reset" signal. The "enable" signal, as will be discussed in detail below in association with FIG. 2, is the actual decision signal from an element (such as a 1-of-N decoder, not shown in FIG. 1), that controls driver selection. As mentioned above, the "enable" signal will have a first logic value when that particular associated set of drivers are to be used for the bus ("assert" enable) and have a second logic value otherwise ("de-assert" enable).

In accordance with the present invention, finite state machine 12 is formed as a 2-bit gray-scale-coded arrangement comprising a pair of flip-flops 18, 20 and an associated pair of multiplexers 22, 24. The "enable" signal is applied as the control input to each multiplexer 22 and 24, as shown. The "clock" and "reset" input signals are applied as their respective inputs to flip-flops 18 and 20 of finite state machine 12. In particular, the "reset" signal is used to return machine 12 to a known condition during "power up" or other situations where there may be interruptions to the operation of the integrated circuit.

Referring back to FIG. 1, the output from multiplexer 22 is applied as the "D" input to flip-flop 18 and, similarly, the output from multiplexer 24 is applied as the "D" input to flip-flop 20. The combination of multiplexer 22 and flip-flop 18 is defined as the "de-assert" signal path of finite state machine 12, while the combination of multiplexer 24 and flip-flop 20 is defined as the "assert" signal path. At the completion of a clock cycle, the "D" input to flip-flop 18 will appear as the "Q" output from flip-flop 18 and thereafter used as the "de-assert" input to XOR gate 16.

An important aspect of the present invention is the inclusion of delay element 14 in the "assert enable" signal path between the "Q" output of flip-flop 20 and XOR gate 16. With the inclusion of such a delay element, the "assert" enable "Q" output from flip-flop 20 will always arrive at XOR gate 16 after the "Q" output ("de-assert") from flip-flop 18. The magnitude of the delay is a matter of design choice, as long as the delay maintains the bus master changeover during a single clock cycle In fact, the delay may be as short as a guard-band value to ensure that all drivers are de-asserted before a new master is enabled. A longer delay may be advantageous for situations such as that encountered, for example, by staggered delays (as a result of an unstructured layout), a large capacitive load on the bus (resulting in enable-disable timing mismatches), or different types of bus drivers (mixing various types of circuit on the same bus). Other reasons for lengthening the delay are possible, those mentioned are merely considered to be illustrative.

Referring back to FIG. 1, the "de-assert" output from flip-flop 18 is fed back as a first input to both multiplexers 22 and 24, where the "de-assert" output is first inverted before being applied as an input to multiplexer 24. The delayed "assert" output from delay element 14 is fed back as a second input to multiplexers 22 and 24. The combination of these feedback signals with the applied enable signal defines the particular arrangement of finite state machine 12 that is capable of generating the 2-bit gray-scale-coded sequence necessary for the proper operation of logic module 10 of the present invention. The operation of state machine 12 is best understood by reference to the following truth table:

TABLE 1

| State {FF20,FF18} | Enable | Present OutEn | Next State {FF20,FF18} | Next OutEn |
|---|---|---|---|---|
| {0,0} | 0 | 0 | {0,0} | 0 (de-assert) |
| {0,0} | 1 | 0 | {1,0} | 1 (assert) |
| {0,1} | 0 | 1 | {0,0} | 0 (de-assert) |

TABLE 1-continued

| State {FF20,FF18} | Enable | Present OutEn | Next State {FF20,FF18} | Next OutEn |
|---|---|---|---|---|
| {0,1} | 1 | 1 | {0,1} | 1 (assert) |
| {1,0} | 0 | 1 | {1,1} | 0 (de-assert) |
| {1,0} | 1 | 1 | {1,0} | 1 (assert) |
| {1,1} | 0 | 0 | {1,1} | 0 (de-assert) |
| {1,1} | 1 | 0 | {0,1} | 1 (assert) |

Since the control sequence is gray-coded (that is, only one bit of the two state bits can change in any given clock cycle), the logic module of the present invention is guaranteed to be completely contention-free. Either the "00" or "11" state represents a "de-assert enable" or disconnected state for a particular bus master, while either "01" or "10" represents an "assert enable" or driving state for that particular bus master.

The operation of the logic module of the present invention may best be understood by following through an example of its operation. It is presumed that state machine 12 begins in the "00" state (since a "reset" signal will always returns machine 12 to this condition). Referring to Table 1, it is seen that OutEn is not asserted (i.e., has a logic value of "0"), so this particular bus driver is not the "master" driver at the moment. As long as the "Enable" input is not asserted (that is, remains at the logic "0" level), the state will not change. When the "Enable" is asserted at a particular clock edge, the associated logic "1" value will propagate through flip-flops 18, 20 and multiplexers 22, 24, causing the "OutEn" signal to change to the "10" state, as shown in Table 1. The rising transition on the output of flip-flop 20 thus asserts OutEn to drive the bus, but only after traversing delay element 14. At some subsequent clock edge, "Enable" is de-asserted to relinquish bus control to another master. When this occurs, the "0" introduced along the "enable" path propagates through state machine 12, forming a "11" state. The presence of this rising edge at flip-flop 18 "de-asserts" OutEn through XOR 16. Since this signal does not pass through delay element 14, the "de-assert" signals reaches OutEn relatively quickly when compared to the arrival of an "assert" signal at another logic module.

Therefore, as a particular logic module 10 of the present invention cycles through being selected and de-selected as the bus master, finite state machine 12 continues to cycle through the state sequence 00-10-11-01-00-10-11 . . . In general, the particular state sequence implemented in the present invention assures that "turn on"/assert control of the associated bus drivers passes through the delayed signal path and the "turn off"/de-assert control passes through the non-delayed path.

FIG. 2 illustrates a particular integrated circuit arrangement utilizing a set of four logic modules of the present invention, denoted $10_0$–$10_3$, for use with a set of four bus signals, $BusIn_0$–$BusIn_3$, respectively. Also illustrated in FIG. 2 are the "reset" and "clock" signals discussed above in associated with the description of logic module 10 in FIG. 1. Referring to FIG. 2, a 1-of-N decoder 40 is used to select the desired "bus master" for a particular period of time. In one example, a set of input signals designated "enable", and a 2-bit "select master" are applied as inputs to decoder 40 and used to generate a set of four output "enable" signals, one signal designated as the "assert" and the remaining three designated as "de-assert" signals. In conventional logic arrangements, the "assert" may be a logic "1" and the "de-assert" a logic "0" (although the complement may also be used). Each logic module $10_I$ thus receives as separate inputs the "enable" output from decoder 40 and the "clock" and "reset" signals. The output of each logic module 10 is thereafter applied as the control input to an associated driver gate $42_0$–$42_3$, where the bus driver signals are also applied as inputs to their respective driver gates $42_0$–$42_3$, in the manner shown in FIG. 2. Therefore, when a particular logic module 10 receives an "assert" signal as its enable input on a clock edge (for example, logic module $10_2$), all four logic modules will first "de-assert" and then the (delayed) "assert" will pass through delay element $14_2$ of logic module $10_2$ (still during the same clock signal), activate gate $42_2$, allowing signal $BusIn_2$ to thereafter be applied as the driving signal to the bus.

It is to be understood that various other finite state machine arrangements may be used to generate the required 00-01-11-10-00 . . . sequence useful in providing the (delayed) "assert" and "de-assert" signals in accordance with the present invention. As long as the same finite state machine circuit is utilized in each logic module of the plurality of N logic modules deployed within a particular integrated circuit, the "break-before-make" bus driver selection of the present invention will be satisfied.

What is claimed is:

1. A logic module for generating a "bus master enable" output signal that comprises a first, "assert" value which is delayed with respect to a second, "de-assert" value, said "bus master enable" signal for controlling the application of a drive signal to a bus on an integrated circuit, the logic module comprising a finite state machine responsive to an "enable" input signal, said "enable" input signal having a first value associated with the "assert" state and a second value associated with the "de-assert" state, said finite state machine also responsive to an integrated circuit clock signal, said finite state machine generating a pair of output signals defined as a "de-assert" output signal and an "assert" output signal, said pair of output signals generated during each clock cycle of said input clock signal;

a delay element disposed to receive the "assert" output signal generated by said finite state machine, the magnitude of said delay element being less than a single clock cycle; and an exclusive-OR gate having as inputs the "de-assert" output from said finite state machine and the delayed "assert" output from said delay element, the exclusive-OR gate providing as an output the "bus master enable" output signal of said logic module.

2. A logic module as defined in claim 1 wherein the finite state machine is also responsive to a "reset" input signal for returning said finite state machine to a known state.

3. A logic module as defined in claim 1 wherein the finite state machine comprises a first multiplexer including a pair of signal inputs and a control input, the "enable" signal applied as the control input, said first multiplexer providing an output signal that switches between said pair of input signals as controlled by said "enable" signal;

a first flip-flop having a signal input and a clock input, the output of said first multiplexer applied as the signal input to said first flip-flop, the input "clock" signal applied to the clock input of said first flip-flop, said first flip-flop providing as an output a "de-assert" bus control signal, the combination of said first multiplexer and said first flip-flop defining the "de-assert" signal path in the finite state machine;

a second multiplexer including a pair of signal inputs and a control input, said "enable" signal applied as the control input, said second multiplexer providing an output signal that switches between said pair of input signals as controlled by said "enable" signal; and a second flip-flop having a signal input and a clock input, the output of said second multiplexer applied as the signal input to said second flip-flop, said input "clock" signal applied to the clock input of said second flip-flop, said second flip-flop providing as an output an "assert" bus control signal.

4. A logic module as defined in claim 3 wherein the logic module further includes a "reset" input signal, said "reset" input signal applied as a "reset" input to the first and second flip-flops.

5. A controller arrangement for selecting a bus driver circuit from a plurality of N bus driver circuits, said controller comprising a plurality of N logic modules, each logic module coupled to a separate one of the plurality of N bus driver circuits for generating a plurality of 1-N "de-assert" control signals, followed by a single "assert" control signal, during a single clock cycle, wherein each logic module comprises a finite state machine responsive to an "enable" input signal, said "enable" input signal having a first value associated with the "assert" state and a second value associated with the "de-assert" state, said finite state machine also responsive to an integrated circuit clock signal, said finite state machine generating a pair of output signals defined as a "de-assert" output signal and an "assert" output signal, said pair of output signals generated during each clock cycle of said input clock signal;

a delay element disposed to receive the "assert" output signal generated by said finite state machine, the magnitude of said delay element being less than a single clock cycle; and an exclusive-OR gate having as inputs the "de-assert" output from said finite state machine and the delayed "assert" output from said delay element, the exclusive-OR gate providing as an output the "bus master enable" output signal of said logic module.

6. A controller as defined in claim 5 wherein the finite state machine is also responsive to a "reset" input signal for returning said finite state machine to a known state.

7. A controller as defined in claim 5 wherein the finite state machine comprises a first multiplexer including a pair of signal inputs and a control input, the "enable" signal applied as the control input, said first multiplexer providing an output signal that switches between said pair of input signals as controlled by said "enable" signal;

a first flip-flop having a signal input and a clock input, the output of said first multiplexer applied as the signal input to said first flip-flop, the input "clock" signal applied to the clock input of said first flip-flop, said first flip-flop providing as an output a "de-assert" bus control signal, the combination of said first multiplexer and said first flip-flop defining the "de-assert" signal path in the finite state machine;

a second multiplexer including a pair of signal inputs and a control input, said "enable" signal applied as the control input, said second multiplexer providing an output signal that switches between said pair of input signals as controlled by said "enable" signal; and a second flip-flop having a signal input and a clock input, the output of said second multiplexer applied as the signal input to said second flip-flop, said input "clock" signal applied to the clock input of said second flip-flop, said second flip-flop providing as an output an "assert" bus control signal.

8. A controller as defined in claim 7 wherein the logic module further includes a "reset" input signal, said "reset" input signal applied as a "reset" input to the first and second flip-flops.

9. An integrated circuit including a controller arrangement for selecting a bus driver circuit from a plurality of N bus driver circuits, said controller comprising a plurality of N logic modules, each logic module coupled to a separate one of the plurality of N bus driver circuits for generating a plurality of 1-N "de-assert" control signals, followed by a single "assert" control signal, during a single clock cycle, wherein each logic module comprises a finite state machine responsive to an "enable" input signal, said "enable" input signal having a first value associated with the "assert" state and a second value associated with the "de-assert" state, said finite state machine also responsive to an integrated circuit clock signal, said finite state machine generating a pair of output signals defined as a "de-assert" output signal and an "assert" output signal, said pair of output signals generated during each clock cycle of said input clock signal;

a delay element disposed to receive the "assert" output signal generated by said finite state machine, the magnitude of said delay element being less than a single clock cycle; and an exclusive-OR gate having as inputs the "de-assert" output from said finite state machine and the delayed "assert" output from said delay element, the exclusive-OR gate providing as an output the "bus master enable" output signal of said logic module.

10. An integrated circuit as defined in claim 9 wherein the finite state machine is also responsive to a "reset" input signal for returning said finite state machine to a known state.

11. An integrated circuit as defined in claim 9 wherein the finite state machine comprises a first multiplexer including a pair of signal inputs and a control input, the "enable" signal applied as the control input, said first multiplexer providing an output signal that switches between said pair of input signals as controlled by said "enable" signal;

a first flip-flop having a signal input and a clock input, the output of said first multiplexer applied as the signal input to said first flip-flop, the input "clock" signal applied to the clock input of said first flip-flop, said first flip-flop providing as an output a "de-assert" bus control signal, the combination of said first multiplexer and said first flip-flop defining the "de-assert" signal path in the finite state machine;

a second multiplexer including a pair of signal inputs and a control input, said "enable" signal applied as the control input, said second multiplexer providing an output signal that switches between said pair of input signals as controlled by said "enable" signal; and a second flip-flop having a signal input and a clock input, the output of said second multiplexer applied as the signal input to said second flip-flop, said input "clock" signal applied to the clock input of said second flip-flop, said second flip-flop providing as an output an "assert" bus control signal.

12. An integrated circuit defined in claim 9 wherein the logic module further includes a "reset" input signal, said "reset" input signal applied as a "reset" input to the first and second flip-flops.

* * * * *